(12) United States Patent
Doddaiah et al.

(10) Patent No.: US 11,880,576 B2
(45) Date of Patent: Jan. 23, 2024

(54) MISALIGNED IO SEQUENCE DATA DEDUPLICATION (DEDUP)

(71) Applicant: EMC IP Holding Company LLC, Hopkinton, MA (US)

(72) Inventors: Ramesh Doddaiah, Westborough, MA (US); Steve Lathrop, Milford, MA (US); Anoop Raghunathan, Ashland, MA (US); Jeremy O'Hare, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 17/160,526

(22) Filed: Jan. 28, 2021

(65) Prior Publication Data

US 2022/0236900 A1    Jul. 28, 2022

(51) Int. Cl.
*G06F 3/06*    (2006.01)

(52) U.S. Cl.
CPC .......... *G06F 3/0641* (2013.01); *G06F 3/0619* (2013.01); *G06F 3/0659* (2013.01); *G06F 3/0689* (2013.01)

(58) Field of Classification Search
None
See application file for complete search history.

(56) References Cited

U.S. PATENT DOCUMENTS

2022/0100385 A1 *   3/2022   Shabi .................... G06F 3/0608

FOREIGN PATENT DOCUMENTS

WO      WO-2017192284 A1 *  11/2017   .......... G06F 3/0608

* cited by examiner

*Primary Examiner* — Michael Alsip
(74) *Attorney, Agent, or Firm* — Krishnendu Gupta; Nikhil Patel (57) ABSTRACT

Aspects of the present disclosure relate to data deduplication (dedup) techniques for storage arrays. In embodiments, a sequence of input/output (IO) operations in an IO stream received from one or more host devices by a storage array are identified. Additionally, a determination can be made as to whether a set of previously received IO operations match the identified IO sequence based on a time series relationship between the identified IO sequence and the previously received IO operations. Further, one or more data deduplication (dedup) techniques can be performed on the matching IO sequence.

20 Claims, 6 Drawing Sheets

MISALIGNED IO SEQUENCE DATA DEDUPLICATION (DEDUP)

BACKGROUND

A storage array is a data storage system for block-based storage, file-based storage, or object storage. Rather than store data on a server, storage arrays use multiple drives in a collection capable of storing a vast amount of data. Storage arrays can include a central management system that manages the data. Storage arrays can establish data dedupe techniques to maximize capacity of their storage drives. Data deduplication techniques eliminate redundant data in a data set. The techniques can include identifying copies of the same data and deleting the copies such that only one copy remains.

SUMMARY

Aspects of the present disclosure relate to data deduplication (dedup) techniques for storage arrays. In embodiments, a sequence of input/output (IO) operations in an IO stream received from one or more host devices by a storage array are identified. Additionally, a determination can be made as to whether a set of previously received IO operations match the identified IO sequence based on an IO rolling offsets empirical distribution model. Further, one or more data deduplication (dedup) techniques can be performed on the matching IO sequence.

In embodiments, a data track related to each IO operation of the IO stream can be identified. The data track can be related to one of the storage system's storage devices. Further, a unique fingerprint can be generated using the identified data track's address. Additionally, a searchable fingerprint data structure configured to map each unique fingerprint to its related data track address can be updated.

In embodiments, a temporal parameter corresponding to each IO operation in the received IO stream can be generated. The searchable fingerprint data structure can be updated to associate each fingerprint with the temporal parameter of the fingerprint's related IO operation.

In embodiments, the temporal parameter of each IO operation can be compared with one or more previously received IO operations of the IO stream to generate the IO rolling offsets empirical distribution model. Using the IO rolling offsets empirical distribution model, one or more sequences of IO operations in the IO stream can be identified.

In embodiments, for each IO operation belonging to at least one of the IO sequences, data can be appended to each IO operation's related fingerprint with information identifying each IO operation's relationship with at least one of the IO sequences.

In embodiments, one or more host devices communicatively coupled to the storage system can be scanned. Further, at least one logical block address (LBA) having metadata associating the at least one LBA with an IO sequence received from each host device can be identified.

In embodiments, the scanning can be limited to each host device's LBAs having the IO sequence identifying metadata.

In embodiments, a unique LBA fingerprint can be generated for each LBA of the scanned host devices. Additionally, a searchable LBA fingerprint data structure can be generated from the generated unique LBA fingerprints.

In embodiments, a search of the searchable fingerprint data structure for a fingerprint alignment of the IO sequence and a previously stored IO sequence can be performed in response to identifying the IO sequence. Further, the one or more data dedupe techniques can be performed on data associated with each data track related to the aligned IO sequences in response to finding a match.

In embodiments, a search of the searchable LBA fingerprint data structure can be performed to identify a match the IO sequence and a misaligned previously stored IO sequence in response to a search for a match between the IO sequence and a previously stored IO sequence returning a miss. In response to finding a match, the one or more data dedupe techniques can be performed on data associated with each data track related to the misaligned IO sequences.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Storage arrays can establish data dedupe techniques to maximize capacity of their storage drives. Data deduplication techniques eliminate redundant data in a data set. The techniques can include identifying copies of the same data and deleting the copies such that only one copy remains.

To identify duplicated data, the techniques can generate fingerprint for each track of data stored on a storage array and store them in a hash table. Furthermore, some dedupe techniques can include performing dedupe operations at a fixed size (e.g., a fixed 128K chunk) track aligned boundaries. If a set of data, which matches another set, relates to tracks that are shifted by couple of bytes or blocks, such techniques are unable to dedupe the misaligned tracks. As such, these dedupe techniques inefficiently use the array's storage capacity. To address boundary shift problems of fixed chunk dedupe techniques, current solutions use algorithmic dedupe techniques such as dynamic chunking algorithms. Such dynamic chunking techniques require the production of multiple fingerprints to find a matching fingerprint per track. As such, the dynamic chunking techniques are resource intensive and use a costly amount of CPU cycles and dedupe SLIC (small I/O card) resources.

For example, a track can have 256 (or N) data blocks. Thus, dynamic chunking algorithms can produce 256 (or N)

rolling fingerprints that span across multiple tracks. Further, if there are multiple blocks of rolling offsets (e.g., 4K or 4M), the chunking algorithms generate 64 (or X)=(256 or N blocks/4k(M)) new fingerprints per track. To match an existing fingerprint, dedupe generally requires at least one 64 (or X) new fingerprints to match with any existing fingerprint to improve store efficiency. Thus, if a host issues a 1 MB sequential WRITE (e.g., 2048 blocks or 8 tracks of storage), a rolling 4k offset chunking algorithm generates 8*64=512 fingerprints for each IO across multiple tracks (e.g., eight (8) tracks). As such, these chunk algorithms are also costly in terms of use of an array's storage.

Figure 1:
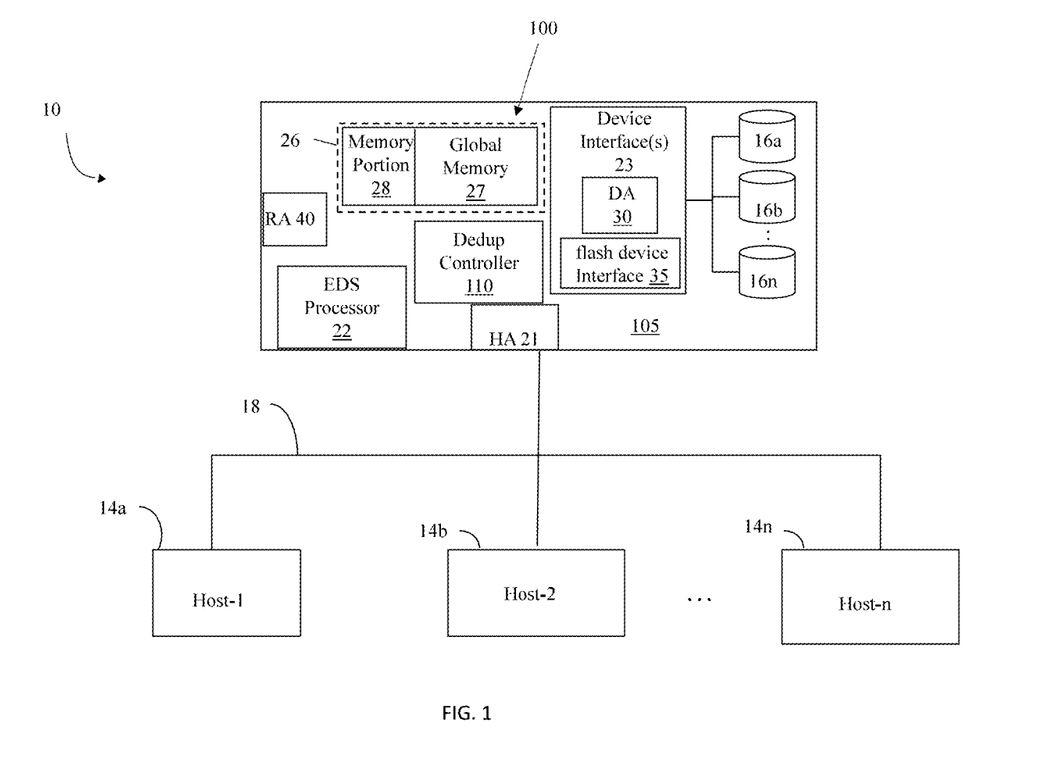
FIG. 1 is a block diagram of a storage system in accordance with example embodiments disclosed herein.

Referring to FIG. 1, shown is an example of an embodiment of a system 10 that can be used in connection with performing the embodiments described herein. The system 10 includes a data storage array 105 connected to host systems 14a-n through communication medium 18. The storage array 105 can include components 100 configured to perform data storage operations.

In embodiments, the hosts 14a-n can access the data storage array 105, for example, to perform input/output (IO) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, network (including a Storage Area Network (SAN)) or other wireless or other hardwired connection(s) by which the host 14a-n can access and communicate with the data storage array 105. The hosts 14a-n can also communicate with other components included in the system 10 via the communication medium 18.

Each of the hosts 14a-n and the data storage array 105 can be connected to the communication medium 18 by any one of a variety of connections as can be provided and supported in accordance with the type of communication medium 18. The processors included in the hosts 14a-n can be any one of a variety of proprietary or commercially available single or multi-processor system, such as an Intel-based processor, or other type of commercially available processor able to support traffic in accordance with each embodiment and application.

It should be noted that the examples of the hardware and software that can be included in the data storage array 105 are described herein in more detail and can vary with each embodiment. Each of the hosts 14a-n and data storage array 105 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, Non-Volatile Memory Express (NVMe), and the like. Some or all the connections by which the hosts 14a-n and data storage array 105 can be connected to the communication medium can pass through other communication devices, such switching equipment that can exist such as a phone line, a repeater, a multiplexer or even a satellite.

Each of the hosts 14a-n can perform different types of data operations in accordance with different types of tasks. In embodiments, any one of the hosts 14a-n can issue a data request to the data storage array 105 to perform a data operation. For example, an application executing on one of the hosts 14a-n can perform a read or write operation resulting in one or more data requests to the data storage array 105.

It should be noted that although array 105 is illustrated as a single data storage array, array 105 can represent multiple data storage arrays alone, or in combination with, other data storage devices, systems, appliances, and/or components having suitable connectivity, such as in a SAN, in an embodiment using the embodiments herein. It should also be noted that an embodiment can include data storage arrays or other components from one or more vendors. In subsequent examples illustrated the embodiments herein, reference can be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage array 105 can be a data storage array including a plurality of data storage devices 16a-n. The data storage devices 16a-n can include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, can also be referred to as a RAM drive. SSD can refer to solid state electronics devices as distinguished from electromechanical devices, such as hard drives, having moving parts. Flash devices or flash memory based SSDs are one type of SSD that contains no moving parts. The embodiments described herein can be used in an embodiment in which one or more of the devices 16a-n are flash drives or devices. More generally, the embodiments herein can also be used with any type of SSD although following paragraphs can refer to a particular type such as a flash device or flash memory device.

The data storage array 105 can also include different types of adapters or directors, such as an HA 21 (host adapter), RA 40 (remote adapter), and/or device interface 23. Each of the adapters HA 21, RA 40 can be implemented using hardware including a processor with local memory with code stored thereon for execution in connection with performing different operations. The HA 21 can be used to manage communications and data operations between one or more host systems 14a-n and the memory 26 which can include a global memory (GM) 27 and a memory portion 28. In an embodiment, the HA 21 can be a Fibre Channel Adapter (FA) or another adapter which facilitates host communication. The HA 21 can be characterized as a front-end component of the data storage array 105 which receives a request from one or more of the hosts 14a-n. The data storage array 105 can include one or more RAs (e.g., RA 40) that can be used, for example, to facilitate communications between data storage arrays. The data storage array 105 can also include one or more device interfaces 23 for facilitating data transfers to/from the data storage devices 16a-n. The data storage interfaces 23 can include device interface modules, for example, one or more disk adapters (DAs) 30 (e.g., disk controllers), flash drive interface 35, and the like. The DA 30 can be characterized as a back-end component of the data storage array 105 which interfaces with the physical data storage devices 16a-n.

One or more internal logical communication paths can exist between the device interfaces 23, the RAs 40, the HAs 21, and the memory 26. An embodiment, for example, can use one or more internal buses and/or communication modules. For example, the global memory 27 can be used to facilitate data transfers and other communications between the device interfaces, HAs and/or RAs in a data storage array. In one embodiment, the device interfaces 23 can perform data operations using a cache that can be included in the global memory 27, for example, when communicating with other device interfaces and other components of the data storage array. Memory portion 28 is a portion of memory 26 that can be used in connection with other designations that can vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, can also be included in an embodiment.

Host systems 14a-n provide data and access control information through channels (e.g., via communications medium 18) to the storage array 105 can also provide data to the host systems 14a-n also through the channels. In embodiments, the host systems 14a-n are configured to indirectly address the drives or devices 16a-n via one or more logical devices or logical volumes (LVs). The LVs can correspond to the actual physical devices or drives 16a-n. For example, one or more LVs can reside on a single physical drive or multiple drives. Data in a single data storage system, such as a single data storage array 105, can be accessed by multiple hosts allowing the hosts to share the data residing therein. The HA 21 can be used in connection with communications between a data storage array 105 and one or more of the host systems 14a-n. The RA 40 can be used in facilitating communications between two data storage arrays. The DA 30 can be one type of device interface used in connection with facilitating data transfers to/from the associated disk drive(s) 16a-n and LV(s) residing thereon. A flash device interface 35 can be another type of device interface used in connection with facilitating data transfers to/from the associated flash devices and LV(s) residing thereon. It should be noted that an embodiment can use the same or a different device interface for one or more different types of devices than as described herein.

The device interface, such as a DA 30, performs IO operations on a drive 16a-n. In the following description, data residing on an LV can be accessed by the device interface following a data request in connection with IO operations that other directors originate. Data can be accessed by LV in which a single device interface manages data requests in connection with the different one or more LVs that can reside on a drive 16a-n. For example, a device interface can be a DA 30 that accomplishes the foregoing by creating job records for the different LVs associated with a device. These different job records can be associated with the different LVs in a data structure stored and managed by each device interface.

The array 105 can further include a dedupe controller 110 configured to perform one or more storage optimization techniques. For example, the controller 110 can perform one or more dedupe techniques based on an analysis of, e.g., historical/current telemetry data, and historical/real-time IO workloads. In embodiments, the controller 110 identifies a sequence of input/output (IO) operations in an IO stream received from one or more host devices by a storage array. Additionally, the controller 110 determines whether a set of previously received IO operations match the identified IO sequence based on a rolling IO offset relationship between the identified IO sequence and the previously received IO operations. Further, the controller 110 can perform one or more data deduplication (dedup) techniques on the matching IO sequence.

Although the dedupe controller 110 is illustrated as being a component included in the array 105, the controller 110 can exist external to the data storage array 105 and can communicate with the data storage array 105 using any one of a variety of communication connections. In other embodiments, the dedupe controller 110 can exist internal to an Enginuity Data Services (EDS) processor 22 and consume shared resources of the EDS 22, e.g., share the array's processing resources. In one embodiment, the dedupe controller 110 can communicate with the data storage array 105 through several different connections including, but not limited to, a serial port, a parallel port, and a network interface card via an Ethernet connection. Using the Ethernet connection, for example, the dedupe controller 110 can communicate directly with DA 30 and HA 21 within the data storage array 105.

Figure 2:
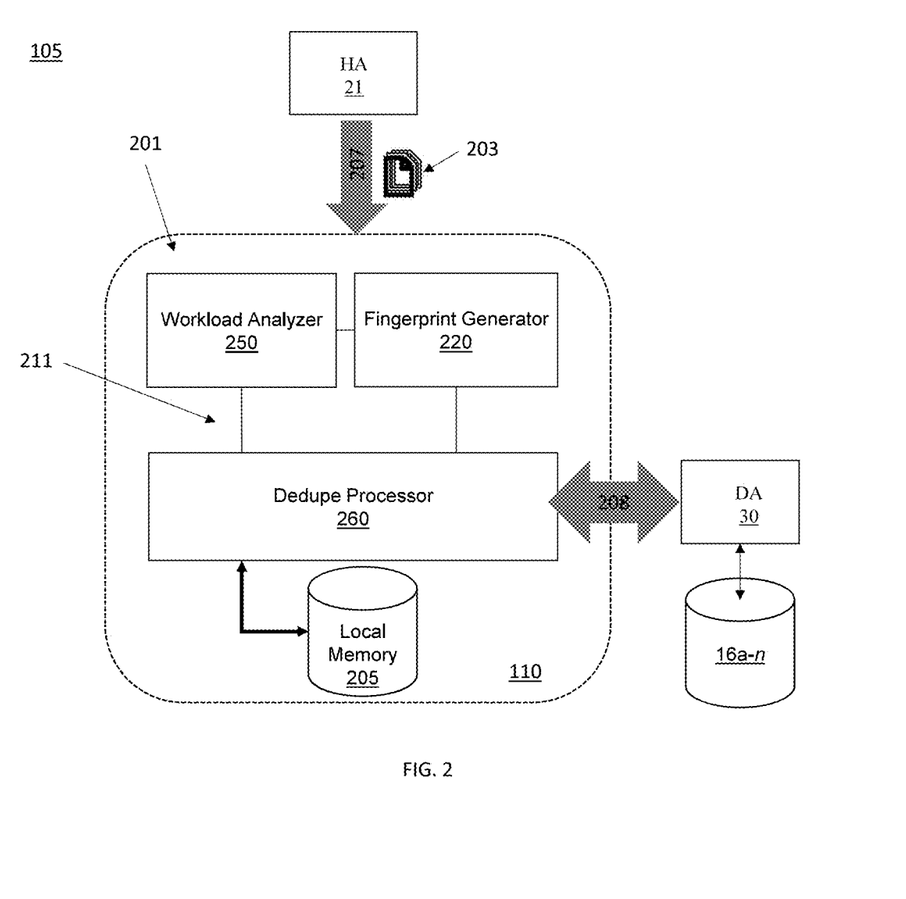
FIG. 2 is a block diagram of a data deduplication (dedup) controller in accordance with example embodiments disclosed herein.

Referring to FIG. 2, a storage array can include a dedupe controller 110 communicatively coupled to an HA 21, e.g., via a Fibre channel 207. It should be noted that the dedupe controller 110 and/or any of its elements 200 201 (e.g., software and hardware elements) can be any one of a variety of commercially available processors, such as an Intel-based processor, and the like. Allow the elements 200 are illustrated in the dedupe controller 110, all or portions of the elements 200 can also reside elsewhere such as, for example, on HA 21, EDS 22, and DA 30 of FIG. 1. In other examples, the dedupe controller 110 can be a parallel processor such as a graphical processing unit (GPU).

In embodiments, the host adapter 21 includes one or more ports (not shown) configured to transmit/receive IOs to/from one or more hosts devices 14a-n. The HA 21 can include one or more ports (not shown) that include unique identifiers. In embodiments, the array 105 can map each identifier to one or more of the hosts 14a-n and applications operated by the hosts 14a-n. Based on the identifier, the array 105 can determine one or more characteristics of each received IO. A characteristic can include a service level (SL), performance expectation, quality of service (QoS), size, type (e.g., read vs write), and the like. In response to receiving an IO, the HA 21 can identify one or more data tracks that provide storage services to data involved with the IO. In other examples, the array 105 can receive the data involved with in IO for a first time. In such circumstances, the DA 30 can assign one or more data tracks of at least one of the storage devices 16a-n storage device to provide storage services. A data track can correspond a location of one or more of the storage devices 16a-n.

In response to receiving an IO operation including a data write request via, e.g., the Fibre channel 207, the dedupe controller 110 can provide data deduplication services to optimize the array's storage capacity (e.g., efficiently control utilization of storage resources). For example, the controller 110 can perform one or more dedupe operations that reduce an impact of redundant data on storage costs. In an example, one or more of the hosts 14a-n can use the array 105 to store email that can include one or more attachments. Accordingly, the email and its attachments can require several data tracks of storage. In some scenarios, a first host 14a may have previously requested the array 105 to store the email and its attachments. Later, the first host 14a can forward the email to a second host 14b. In response to receiving the email, the second host 14b may issue an IO to the array 105 that includes a request to store the email. Using a data deduplication technique, the controller 110 can determine that the email is a duplicate of the previously stored email and discard the email. By using data deduplication, the controller 110 is able to conserve the array's storage capacity.

In embodiments, the controller 110 is configured to identify sequential write IO pattern across multiple tracks and store that information in local memory 205 (e.g., in a portion of a track identifier's (TID's) persistent memory region). For example, the controller 110 is configured to identify a dynamic temporal behavior of each sequential write IO pattern as described in greater detail herein. Further, the controller 110 can determine an empirical distribution mean of successful rolling offsets from tracks related to the sequential write IO pattern. In embodiments, the controller can determine the empirical distribution mean from a first set of sample IOs of the sequential write IO pattern. Using the empirical distribution mean, the controller 110 is able to locate to find an optimal (e.g., statistically relevant) rolling offset of the sequential write IO pattern. By using such a technique, embodiments of the present disclosure can advantageously reduce the need to generate large quantities of fingerprints per track. As such, the embodiments can further significantly reduce consumption of the array's storage resources.

In embodiments, the controller 110 can include a fingerprint generator 220 that generates a dedupe fingerprint for each data track related to each IO. Additionally, the generator 220 can store the fingerprints in one or more data structures (e.g., hash tables) that associate the fingerprints with their respective data tracks. Further, the generator 220 can link related data tracks. For example, if a source Track A's fingerprint matches with target track B's fingerprint, the generator 220 can link them as similar data blocks in the hash table. Accordingly, the generator 220 can improve disk storage efficiency by eliminating a need to store multiple references to related tracks.

In embodiments, the fingerprint generator 220 can segment the data involved with a current IO into one or more data portions. Each segmented data portion can correspond to a size of one or more of the data tracks of the devices 16*a-n*. For each segmented data portion, the generator 220 can generate a data segment fingerprint. Additionally, the generator 220 can generate data track fingerprints representing the data of each data track identified in the current IO's metadata. For example, each IO can include one or more LVs and/or logical unit numbers (LUNs) representing the data tracks that are allocated to provide storage services for the data involved with the IO. The fingerprints can have a data format optimized (e.g., having characteristics) for search operations. As such, the fingerprint generator 220 can use a hash function to generate a fixed-sized identifier (e.g., fingerprint) from each track's data and segmented data portion. Thereby, the fingerprint generator 220 can restrict searches to fingerprints having a specific length to increase search performances (e.g., speed). Additionally, the generator 30 can determine a size of the fingerprints that reduces a probability of distinct data portions having the same fingerprint. Using such fingerprints, the controller 110 can advantageously consume a minimal amount of the array's processing (e.g., CPU) resources to perform a search.

In embodiments, the controller 110 can include a workload analyzer 250 can be communicatively coupled to the HA 21 via a communicative primitive such as Fibre Channels and NVMe (Non-Volatile Memory Express) communication interfaces 207. The analyzer 250 can receive storage telemetry data corresponding to the array and/or its components 100 from the EDS processor 22 of FIG. 1. In examples, the analyzer 250 can include logic and/or circuitry configured to analyze the one or more IO workloads 203 received from the HA 21. The analysis can include identifying one or more characteristics of each IO of the workload 203. For example, each IO can include metadata including information associated with an IO type, data track related to the data involved with each IO, time, performance metrics, and telemetry data, amongst other storage array IO related information. Based on historical and/or current IO characteristic data, the analyzer 250 can identify IO patterns using, e.g., one or more machine learning (ML) techniques. Using the identified IO patterns, the analyzer 250 can determine whether the array 105 is experience an intensive IO workload. The analyzer 250 can identify the IO workload 203 as being intensive if it includes one or more periods during with the array 105 receives a large volume of IOs per second (IOPS). For any IO associated with an intensive workload, the analyzer 250 can include an indication of the association in the IO's metadata.

In embodiments, the controller 110 can also include a dedupe processor 260 that can perform one or more data deduplication techniques in response to receiving an IO write request. Further, the processor 260 can pause data deduplication operations based on a state of the array 105. For example, the processor 260 perform an array performance check in response to receiving an IO associated with an intensive IO workload. If the array performance check indicates that the array 105 is not meeting at least one performance expectation of one or more of the hosts 14*a-n*, the processor 260 can halt dedupe operations. In other examples, the processor 260 can proceed with performing dedupe operations if an IO is not associated with an intensive workload and/or the array is meeting performance expectations and can continue to do so should the processor 260 continue to perform dedupe operations.

In response to write data involved with a current IO being associated with one or more previously allocated data tracks, the dedupe processor 260 can perform a comparison between one or more portions of the write data and corresponding one or more portions of data previously stored in the previously allocated data tracks using their respective fingerprints. Current naïve data deduplication techniques perform a byte to byte (i.e., brute force) comparison of each fingerprint and disk data. However. Such techniques can consume a significant and/or unnecessary amount of the array's resources (e.g., the array's disk bandwidth, fabric bandwidth, CPU cycles for comparison, memory, and the like). Accordingly, such naïve dedupe techniques can cause the array 105 to fail to meet performance expectations of one or more of the hosts 14*a-n* during peak workloads (e.g., intensive workloads). To avoid such scenarios, the processor 260 can limit a comparison to a subset of the segmented data fingerprints and a corresponding subset of the data track fingerprints.

In response to a number of matching fingerprints, the processor 260 can identify a probability of whether the data involved with the current IO is a duplicate of data previously stored in the array 105. If the probability is above a threshold, the processor 260 can discard the data. If the probability is less than the threshold, the processor 260 can write the data to the data tracks of the devices 16*a-n*.

In further embodiments, the processor 260 can be configured to dedup misaligned matching IO write sequences based on their respective track lengths. For example, if the matching IO write sequences have track lengths less than a threshold, the processor 260 can perform a dynamic chunk dedup operation to remove redundant data. If the track lengths are greater than the threshold, the processor 260 can perform a dedupe operation using a dynamic temporal-based deduplication technique as described in greater detail herein.

For example, the processor 260 can be configured to identify sequential write IO pattern across multiple tracks based on the identified patterns. Further, the processor 260 can and store that information in local memory 205. For example, when a host 14*a-n* IO sequence includes write operations across multiple tracks, a probability of the sequence's related data (or blocks or tracks) being statistically correlated with each other is quite high and also exhibit a high temporal relationship. The processor 260 is configured to detect such a sequential IO stream. First, for example, the processor 260 can check a SCSI logical block count (LBC) size of each IO and/or bulk read each previous track's TID. In other examples, the processor 260 use other sequential write IO identification techniques that include analyzing sequential track allocations, sequential zero reclaim, sequential read IO prefetches to identify sequential write IOs (e.g., sequential write extents). Second, the processor 260 can Further, and search cache tracks for recently executed write operations during a time threshold (e.g., over a several millisecond time window). Third, the processor 260 can mark bits related to the recently executed write operations as being related to a sequential write IO pattern. For example, the processor 260 can mark one or more bits of a track's TID to identify an IO's relationship to a sequential write IO pattern. In an embodiment, the processor 260 can establish one of each track's TID as a sequential IO bit and another bit as a sequential IO checked bit.

Further, the processor 260 can identify a temporal relationship and a level of relative correlation between IOs in a sequential write IO pattern. Based on the temporal relationship and the level of relative correlation, the processor 260 can determine a probability of receiving a matching sequence having rolling offsets across multiple tracks.

Figure 3:
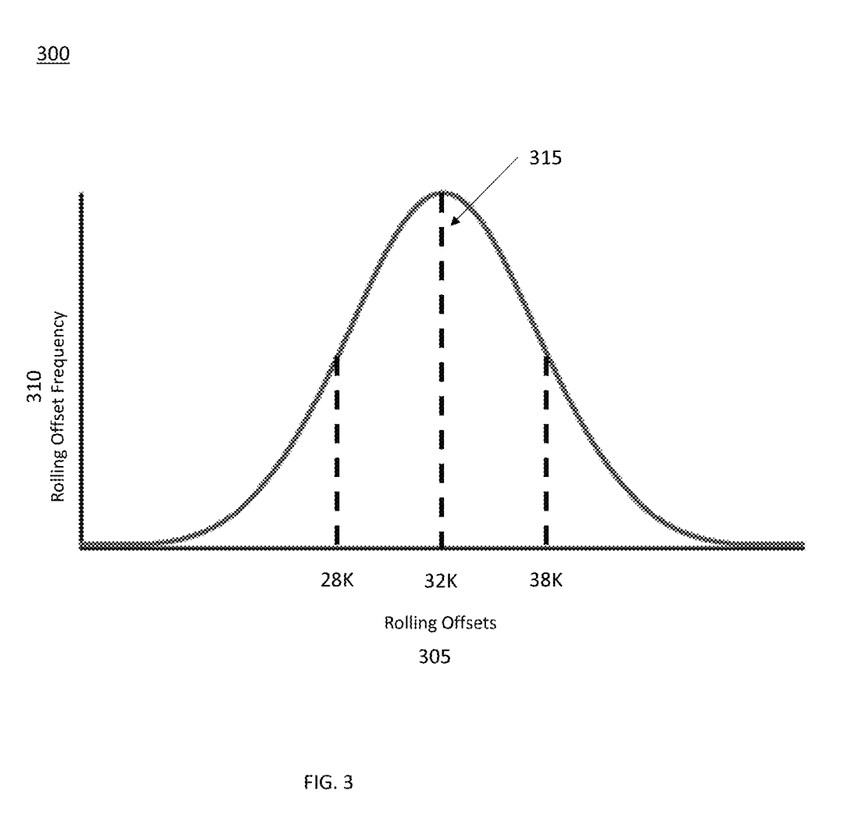
FIG. 3 is a graph illustrating an empirical distribution model a write IO sequence in accordance with example embodiments disclosed herein.

Regarding FIG. 3, the processor 260 can generate an empirical distribution model 300 of the sequence's IO rolling offset frequency 310. For example, the processor 260 can determine the frequencies 310 of a sequential write IO pattern's rolling offsets 305. Using the model 300, the processor 260 can determine a mean rolling offset frequency 315. Using the mean frequency 315, the processor 260 can identify matching misaligned matching IO write sequence patterns.

In embodiments, if the processor 260 can successfully dedupe a first set of P samples from an N sample sequential write IO pattern, where P<N, based on a match of a corresponding set of P samples of another write IO sequence. For example, the processor 260 can generate the empirical distribution frequency model of the sequence's IO rolling offsets 305 using the P samples. Further, the processor 260 can generate a similar empirical distribution model from the remaining P-N samples of the write IO sequence. The processor 260 can further determine a mean IO rolling offset frequency of the P-N empirical distribution model. To identify sequential write IO patterns, the processor 260 can establish a rolling IO frequency offset search value to be equal to the mean IO rolling offset frequency. Using the IO offset search value, the processor 260 can determine whether a recently received current misaligned sequence IO write pattern matches a previously receive write IO sequence. In embodiments, the processor 260 can establish the IO offset search value to be defined as a function of the mean IO rolling offset frequency. For example, the function can define the IO offset search value as one or more standard deviations of the mean IO rolling offset frequency.

In further embodiments, the processor 260 can use a predefined rolling IO frequency offset search value or iterate through a range of rolling offset search values. For example, the range of offset search values can be N, where N>=1K and <=128K offset. Further, the processor 260 can configure the fingerprint generator 220 to generate unique fingerprints based on the rolling offset search value.

Figure 4:
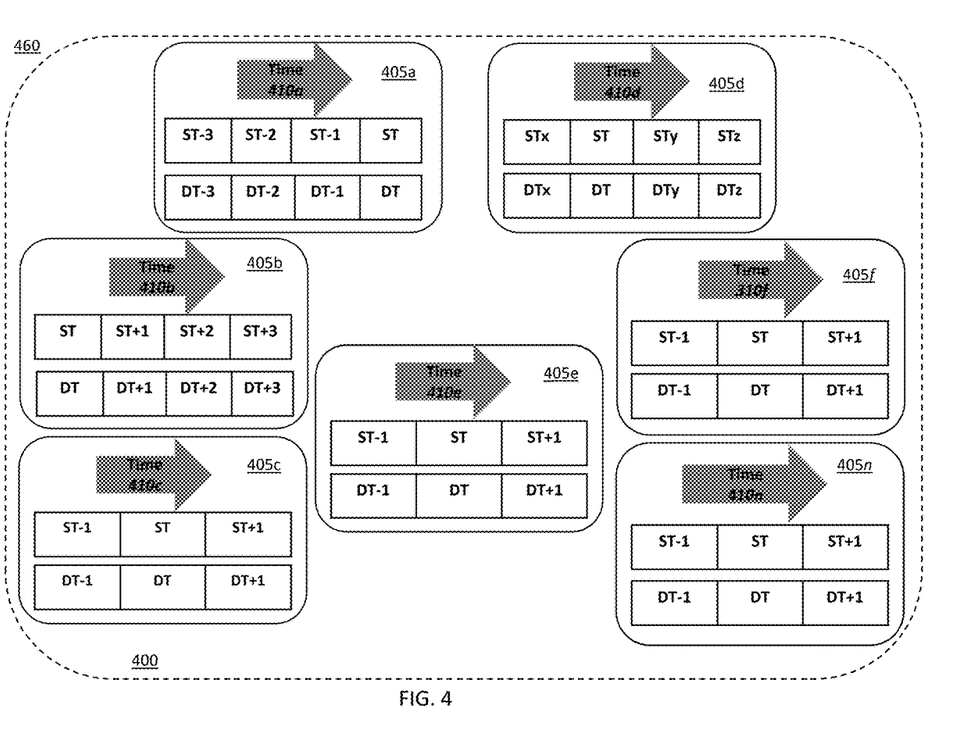
FIG. 4 is a block diagram of a dedup processor in accordance with example embodiments of the present disclosure.

Referring to FIG. 4, the processor 260 can include a policy engine 400 that identify one or more comparison policies 405*a-n*, 410*a-n*. The engine 400 can include non-temporal policies 410*a-n* and temporal policies 405*a-n*. Each of the policies 405*a-n*, 410*a-n* can include unique non-temporal or temporal instructions for comparing segmented data fingerprints and the data track fingerprints. In embodiments, the engine 400 can select one of the policies 405*a-n*, 410*a-n* based on one or more of an analysis performed by the analyzer 250 and/or one or more fingerprint characteristics such as a sequence length and track length.

In response to detecting the hash collision, the engine 400 can select at least one of the policies 405*a-n*, 415*a-n*. Each policy 405*a-n* can include instructions that when executed cause the processor 260 to perform a comparison.

In an embodiment, the engine 400 can include a preceding sequence fingerprint policy 410*a* that compares preceding tracks from a current track of a sequence. For example, if a current IO corresponds to data tracks DT−3, DT−2, DT−1, and DT (i.e., the sequence length is 4), then the engine 400 can select policy 410*a* that includes instructions for the processor 260 to compare the segmented data fingerprints ST−3, ST−2, ST−1, ST with data track fingerprints DT−3, DT−2, DT−1, DT, which each respectively define a time series.

In an embodiment, the engine 400 can include a succeeding sequence fingerprint policy 410*b* that compares succeeding tracks from a current track of a sequence. For example, if a current IO corresponds to data tracks DT, DT+2 and DT+3 (i.e., the sequence length is 4), then the engine 400 can select policy 410*b* that includes instructions for the processor 260 to compare the segmented data fingerprints ST, ST+1, ST+2, ST+3 with data track fingerprints DT, DT+1, DT+2, DT+3, which each respectively define a time series.

In an embodiment, the engine 400 can include an exact match fingerprint policy 410*c* that requires an exact match between a set of segmented data fingerprint tracks and data track fingerprints. For example, if a current IO corresponds to data tracks DT−1, DT and DT+1 (i.e., the sequence length is 3), then the engine 400 can select policy 410*c* that includes instructions for the processor 260 to compare the segmented data fingerprints ST−1, ST and ST+1 with data track fingerprints DT−1, DT and DT+1, which each respectively define a time series.

In an embodiment, the engine 400 can include a random track sequence match fingerprint policy 410*d* that requires an exact match between a set of segmented data fingerprint tracks and data track fingerprints. For example, if a current IO corresponds to a single data track, DT (i.e., the sequence length is 1), the engine 400 performs a comparison based on a current IO's size and/or LBC. For instance, the engine can compare a current segmented data fingerprint track, ST, and its immediately preceding and succeeding fingerprint tracks, ST−1 and ST+1, with corresponding data track fingerprints DT−1, DT and DT+1, which each respectively define a time series.

In an embodiment, the engine 400 can include a host IO size match fingerprint policy 410*e* that compares a randomly selected sequence set of the segmented data fingerprint tracks and data track fingerprints. For example, the engine 400 can compare a current segmented data fingerprint track, ST, and a randomly selected sequence set of its preceding and succeeding tracks, STx, Sty, and STz, with their corresponding data tracks, DTx, DT, DTy, and DTz.

In an embodiment, the engine 400 can include an exact linear temporal sequence match policy 410*f* that defines a 1-to-1 sequence matching comparison between one or more segmented data fingerprint tracks and their corresponding data track fingerprints.

In an embodiment, the engine 400 can include a non-exact linear temporal sequence match policy 410*n* that defines a 1-to-1 sequence matching comparison between one or more segmented data fingerprint tracks and their corresponding data track fingerprints.

In another embodiment, the engine 400 can include a non-exact linear temporal match policy 410*n* that determines a probability of a match in response to identifying one or more mismatches. For example, the processor 260 can identify a probability of whether the data involved with the current IO is a duplicate of data previously stored in the array 105. If the probability is above a threshold, the processor 260 can discard the data. If the probability is less than the threshold, the processor 260 can write the data to the data tracks of the devices 16*a-n*.

For simplicity of explanation, the methods depicted by the figures are described herein as a series of acts. However, acts in accordance with this disclosure can occur in various orders and/or concurrently, and with other acts not presented and described herein. Furthermore, not all illustrated acts can be required to implement the methods in accordance with the disclosed subject matter.

Figure 5:
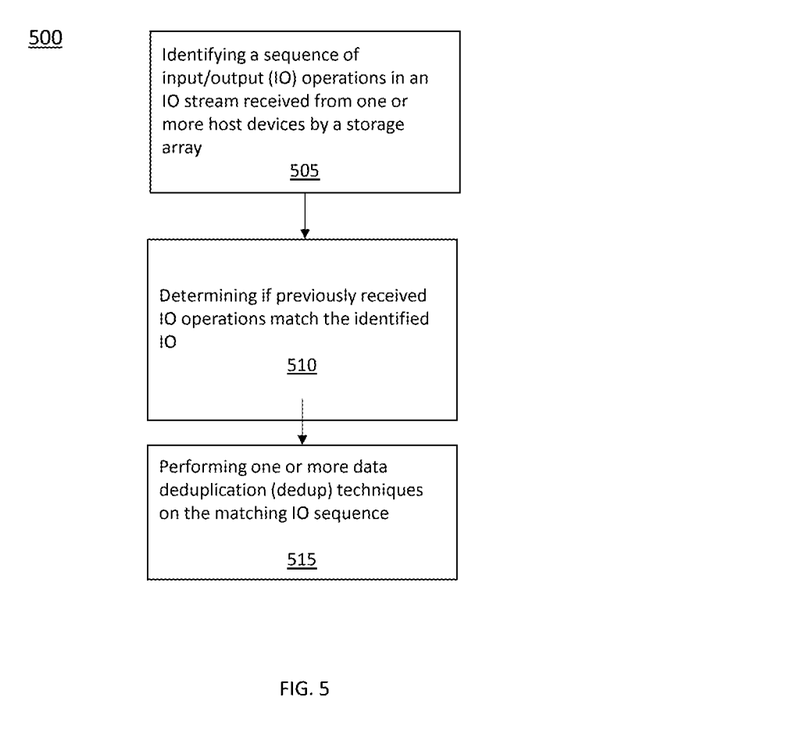
FIG. 5 is a flow diagram of a method for performing data dedupe in accordance with example embodiments disclosed herein.

Referring to FIG. 5, in embodiments, a method 500 can be executed by a dedupe controller (e.g., controller 110 of FIG. 1). The method 500, at 505, can include identifying a sequence of input/output (IO) operations in an IO stream received from one or more host devices by a storage array. In embodiments, each of the IOs can relate to a data track of the storage array. At, 510, the method 500 can further include determining whether a set of previously received IO operations match the identified IO sequence based on a time series relationship between the identified IO sequence and the previously received IO operations. Additionally, the method 500, at 515, can include performing one or more data deduplication (dedup) techniques on the matching IO sequence.

It should be noted that each step of the method 500 can be performed according to any of the techniques described herein, known to those skilled in the art, and/or yet to be known to those skilled in the art.

Figure 6:
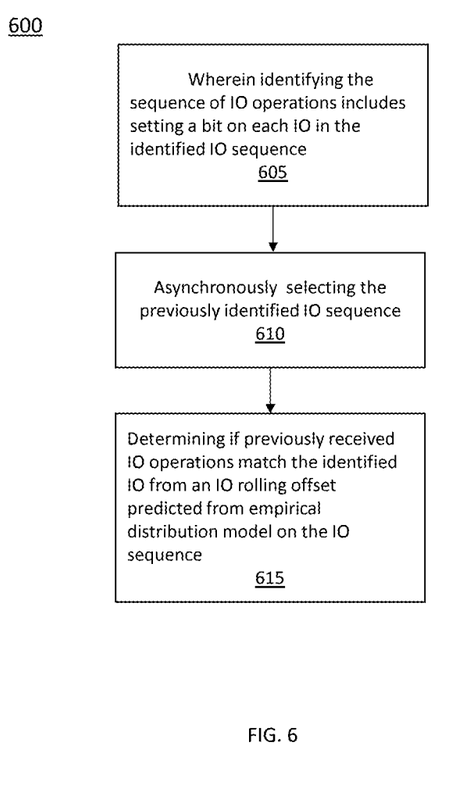
FIG. 6 is a flow diagram of a method for identifying matching sequential IO operations in accordance with example embodiments of the present disclosure.

Referring to FIG. 6, in embodiments, a method 500 can be executed by a dedupe controller (e.g., controller 110 of FIG. 1). The method 500, at 505, can setting a bit on each IO in an identified IO sequence. In embodiments, each of the IOs can relate to a data track of the storage array. At, 610, the method 600 can further include asynchronously selected a previously identified IO sequence. Additionally, the method 600, at 615, can include determining if previously received IO operations match the identified IO from an IO rolling offset predicted from an empirical distribution model on the IO sequence.

It should be noted that each step of the method 600 can be performed according to any of the techniques described herein, known to those skilled in the art, and/or yet to be known to those skilled in the art.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described embodiments can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above-described embodiments can be implemented in a distributed computing system that includes a back-end component. The back-end component can, for example, be a data server, a middleware component, and/or an application server. The above-described embodiments can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein can be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. A method comprising:
identifying a sequence of input/output (IO) write operations in an IO stream received from one or more host devices by a storage array;
generating an empirical distribution model of IO rolling offset occurrences corresponding to the IO sequence, wherein the IO rolling offsets correspond to offsets across multiple tracks;
determining if previously received IO operations match the identified IO sequence based on the empirical distribution model of the sequence's IO rolling offset frequency; and
performing one or more data deduplication (dedup) techniques on the matching IO sequence.

2. The method of claim 1 further comprising:
identifying a data track related to each IO operation of the IO stream, the data track corresponding to one of the storage system's storage devices;
generating a unique fingerprint using the identified data track's address; and
updating a searchable fingerprint data structure configured to map each unique fingerprint to its related data track address.

3. The method of claim 2 further comprising:
generating a temporal parameter corresponding to each IO operation in the received IO stream; and
updating the searchable fingerprint data structure to associate each fingerprint with the temporal parameter of the fingerprint's related IO operation.

4. The method of claim 3 further comprising:
comparing the temporal parameter of each IO operation with one or more previously received IO operations of the IO stream to generate the empirical distribution model of the sequence's IO rolling offset frequency; and
identifying one or more sequences of IO operations in the IO stream using the empirical distribution model of the sequence's IO rolling offset frequency.

5. The method of claim 4 further comprising:
for each IO operation belonging to at least one of the IO sequences, appending data to each IO operation's related fingerprint with information identifying each IO operation's relationship with at least one of the IO sequences.

6. The method of claim 5 further comprising:
scanning one or more host devices communicatively coupled to the storage system;
identifying at least one logical block address (LBA) having metadata associating the at least one LBA with an IO sequence received from each host device.

7. The method of claim 6 further comprising limiting the scanning to each host device's LBAs having the IO sequence identifying metadata.

8. The method of claim 6 further comprising:
generating a unique LBA fingerprint for each LBA of the scanned host devices; and
generating a searchable LBA fingerprint data structure from the generated unique LBA fingerprints.

9. The method of claim 8 further comprising:
in response to identifying the IO sequence, performing a search of the searchable fingerprint data structure for a fingerprint alignment of the IO sequence and a previously stored IO sequence; and
in response to finding a match, performing the one or more data dedupe techniques on data associated with each data track related to the aligned IO sequences.

10. The method of claim 8 further comprising:
in response to a search for a match between the IO sequence and a previously stored IO sequence returning a miss, performing a search of the searchable LBA fingerprint data structure to identify a match the IO sequence and a misaligned previously stored IO sequence;

in response to finding a match, performing the one or more data dedupe techniques of data associated with each data track related to the misaligned IO sequences.

11. An apparatus including at least one processor configured to:

identify a sequence of input/output (IO) write operations in an IO stream received from one or more host devices by a storage array;

generate an empirical distribution model of IO rolling offset occurrences corresponding to the IO sequence, wherein the IO rolling offsets correspond to offsets across multiple tracks;

determine if previously received IO operations match the identified IO sequence based on an the empirical distribution model of the sequence's IO rolling offset frequency; and perform one or more data deduplication (dedup) techniques on the matching IO sequence.

12. The apparatus of claim 11 further configured to:

identify a data track related to each IO operation of the IO stream, the data track corresponding to one of the storage system's storage devices;

generate a unique fingerprint using the identified data track's address; and update a searchable fingerprint data structure configured to map each unique fingerprint to its related data track address.

13. The apparatus of claim 12 further configured to:

generate a temporal parameter corresponding to each IO operation in the received IO stream; and update the searchable fingerprint data structure to associate each fingerprint with the temporal parameter of the fingerprint's related IO operation.

14. The apparatus of claim 13 further configured to:

compare the temporal parameter of each IO operation with one or more previously received IO operations of the IO stream to generate the empirical distribution model of the sequence's IO rolling offset frequency; and identify one or more sequences of IO operations in the IO stream using the empirical distribution model of the sequence's IO rolling offset frequency.

15. The apparatus of claim 14 further configured to:

for each IO operation belonging to at least one of the IO sequences, append data to each IO operation's related fingerprint with information identifying each IO operation's relationship with at least one of the IO sequences.

16. The apparatus of claim 15 further configured to:

scan one or more host devices communicatively coupled to the storage system;

identify at least one logical block address (LBA) having metadata associating the at least one LBA with an IO sequence received from each host device.

17. The apparatus of claim 16 further configured to limit the scanning to each host device's LBAs having the IO sequence identifying metadata.

18. The apparatus of claim 16 further configured to:

generate a unique LBA fingerprint for each LBA of the scanned host devices; and generate a searchable LBA fingerprint data structure from the generated unique LBA fingerprints.

19. The apparatus of claim 18 further configured to:

in response to identifying the IO sequence, perform a search of the searchable fingerprint data structure for a fingerprint alignment of the IO sequence and a previously stored IO sequence; and in response to finding a match, perform the one or more data dedupe techniques on data associated with each data track related to the aligned IO sequences.

20. The apparatus of claim 18 further configured to:

in response to a search for a match between the IO sequence and a previously stored IO sequence returning a miss, perform a search of the searchable LBA fingerprint data structure to identify a match the IO sequence and a misaligned previously stored IO sequence;

in response to finding a match, perform the one or more data dedupe techniques of data associated with each data track related to the misaligned IO sequences.

* * * * *